United States Patent
Nagai

(10) Patent No.: US 9,809,064 B2
(45) Date of Patent: Nov. 7, 2017

(54) PNEUMATIC TIRE

(71) Applicant: BRIDGESTONE CORPORATION, Tokyo (JP)

(72) Inventor: Toshiki Nagai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 233 days.

(21) Appl. No.: 14/425,217

(22) PCT Filed: Sep. 11, 2013

(86) PCT No.: PCT/JP2013/005390
§ 371 (c)(1),
(2) Date: Mar. 2, 2015

(87) PCT Pub. No.: WO2014/064880
PCT Pub. Date: May 1, 2014

(65) Prior Publication Data
US 2015/0217604 A1    Aug. 6, 2015

(30) Foreign Application Priority Data
Oct. 24, 2012 (JP) .................................. 2012-234987

(51) Int. Cl.
| B60C 15/00 | (2006.01) |
| B60C 15/024 | (2006.01) |
| B60C 5/00 | (2006.01) |
| B60C 13/02 | (2006.01) |

(Continued)

(52) U.S. Cl.
CPC ............. *B60C 15/0242* (2013.01); *B60C 5/00* (2013.01); *B60C 13/02* (2013.01); *B60C 15/06* (2013.01); *B60C 13/003* (2013.01); *B60C 2015/061* (2013.01)

(58) Field of Classification Search
CPC ....... B60C 15/00; B60C 15/02; B60C 15/024; B60C 15/0242
See application file for complete search history.

(56) References Cited

FOREIGN PATENT DOCUMENTS

| CN | 1456453 A | 11/2003 |
| EP | 2 839 976 A1 | 2/2015 |
| JP | H06-40223 A | 2/1994 |

(Continued)

OTHER PUBLICATIONS

Machine translation of JP 2011-084148, 2011.*
Dec. 17, 2013 International Search Report issued in International Patent Application No. PCT/JP2013/005390.

*Primary Examiner* — Justin Fischer
(74) *Attorney, Agent, or Firm* — Oliff PLC

(57) ABSTRACT

A pneumatic tire, comprising at least sidewall portions and rim guards each provided at the corresponding sidewall portion, wherein: in a cross section in the width direction of the tire assembled with a prescribed rim, an outer contour line, of the rim guard, situated on the outer side in the tire radial direction than the radially outermost peak of the rim guard has an arcuate configuration of which the center of curvature is located on the external side of the tire; radius of curvature R of the outer contour line is in the range of 5 mm≤R≤40 mm; and provided that H represents a distance in the tire radial direction measured from the radially innermost peak to the outermost position in the tire radial direction of a rim flange, 2 mm≤H≤40 mm.

8 Claims, 3 Drawing Sheets

(51) Int. Cl.
    *B60C 15/06*          (2006.01)
    *B60C 13/00*          (2006.01)

(56) References Cited

FOREIGN PATENT DOCUMENTS

| JP | H11268507 A    |   | 10/1999 |
|----|----------------|---|---------|
| JP | 2002-012012 A  |   | 1/2002  |
| JP | 2002-283815 A  |   | 10/2002 |
| JP | 2003-326921 A  |   | 11/2003 |
| JP | 2004-168201 A  |   | 6/2004  |
| JP | 2005-238916 A  |   | 9/2005  |
| JP | 3839581        | * | 11/2006 |
| JP | 2007-290407 A  |   | 11/2007 |
| JP | 2009-083769 A  |   | 4/2009  |
| JP | 2010-143285 A  |   | 7/2010  |
| JP | 2011-084148 A  |   | 4/2011  |
| JP | 2011-088565 A  |   | 5/2011  |
| WO | 2011/033778 A1 |   | 3/2011  |

* cited by examiner

PNEUMATIC TIRE

TECHNICAL FIELD

The present invention relates to a pneumatic tire and, in particular, a pneumatic tire having successfully reduced rolling resistance thereof, while ensuring a good rim-protecting effect by a rim guard.

BACKGROUND ART

When a pneumatic tire assembled with a prescribed rim is mounted on a vehicle and used, there is a possibility that a part of the rim is brought into contact with a curbstone or a wall due to, for example, the vehicle approaching a shoulder edge of a road or the wall too close, which contact may possibly damage the rim. In order to prevent such a damage of a rim from occurring, there has been generally known a pneumatic tire having an annular rim guard provided on the outer side in the tire radial direction than a rim line to protrude on the outer side in the tire width direction and continuously extend in the tire circumferential direction.

There have been reports in this regard on studies of changing configurations and dimensions of a rim guard to improve performances of a pneumatic tire (e.g. refer to PTL 1 and PTL 2).

For example, PTL 1 discloses a pneumatic radial tire having a rim guard provided therein, wherein a contour of a radially outer side portion of the rim guard has radius of curvature in the range of 15 mm to 40 mm. PTL 1 reduces mass of the pneumatic radial tire thereof, while ensuring a good effect of protecting a rim by the rim guard, by setting radius of curvature of the aforementioned portion of the rim guard within the range described above.

CITATION LIST

Patent Literature

PTL 1: JP2002-012012
PTL 2: JP2003-326921

SUMMARY

However, the conventional pneumatic tire as described above has room for improvement in reduction of rolling resistance thereof because a pneumatic tire exhibiting good fuel efficiency has been demanded in terms of environment protection and energy saving in recent years.

In view of this, an object of the present invention is to provide a pneumatic tire having successfully reduced rolling resistance thereof, while ensuring a good rim-protecting effect by a rim guard.

Specifically, primary structures of the present invention are as follows. A pneumatic tire of the present invention, comprising at least sidewall portions and rim guards, the rim guards each being provided at the corresponding sidewall portion to protrude on the outer side in the tire width direction, characterized in that: in a cross section of the tire in the width direction thereof in a state where the tire has been assembled with a prescribed rim and inflated at pre-scribed internal pressure with no load thereon, each rim guard has at least one peak; an outer contour line, of the rim guard, situated on the outer side in the tire radial direction than the outermost peak in the tire radial direction of the at least one peak, has an arcuate configuration of which the center of curvature is located on the external side of the tire; radius of curvature R of the outer contour line is in the range of 5 mm≤R≤40 mm; and provided that H represents a distance in the tire radial direction measured from the innermost peak in the tire radial direction of the at least one peak of the rim guard to the outermost position in the tire radial direction of a rim flange, 2 mm≤H≤40 mm.

According to the aforementioned structures, it is possible to reduce rolling resistance of the tire, while ensuring a good effect of protecting a rim by a rim guard thereof.

In this connection, a "prescribed rim" represents a rim prescribed for each tire by an industrial standard which is valid in an area where the tire is manufactured and used, and examples thereof include: a standard rim in the case of JATMA (The Japan Automobile Tyre Manufacturers Association, Inc.); "Design Rim" in the case of TRA (THE TIRE and RIM ASSOCIATION INC.); and "Measuring RIM" in the case of ETRTO (European Tyre and Rim Technical Organisation).

"Prescribed internal pressure" represents internal air pressure (the maximum air pressure) of a tire corresponding to the maximum loading capacity of the tire prescribed according to the tire size by an industrial standard such as JATMA.

The pneumatic tire of the present invention further comprises a pair of bead cores and a pair of bead fillers respectively provided on the outer side in the tire radial direction of the bead cores, wherein, in a cross section of the tire in the width direction thereof in a state where the tire has been assembled with a prescribed rim and inflated at pre-scribed internal pressure with no load thereon, the outermost end in the tire radial direction of each bead filler is situated within a range in the tire radial direction defined, when the outermost position in the tire radial direction of the rim flange is regarded as a reference point, from a position 5 mm on the inner side in the tire radial direction of the reference point to a position 40 mm on the outer side in the tire radial direction of the reference point.

Rolling resistance of the tire can be further reduced when the aforementioned positioning requirement is satisfied.

Further, the radius of curvature R is preferably equal to or smaller than 15 mm and more preferably equal to or smaller than 10 mm in the pneumatic tire of the present invention. It is possible to further reduce rolling resistance of the tire by setting the radius of curvature R to be in the aforementioned range.

Yet further, the distance H in the tire radial direction is preferably equal to or smaller than 20 mm and more preferably equal to or smaller than 10 mm in the pneumatic tire of the present invention.

It is possible to further reduce rolling resistance of the tire by setting the distance H in the tire radial direction to be in the aforementioned range.

According to the present invention, it is possible to provide a pneumatic tire having successfully reduced rolling resistance thereof, while ensuring a good effect of protecting a rim by a rim guard.

BRIEF DESCRIPTION OF THE DRAWINGS

The present invention will be further described below with reference to the accompanying drawings, wherein.

DETAILED DESCRIPTION

A pneumatic tire of the present invention (which tire may occasionally be referred to simply as "tire" hereinafter) will be demonstratively described in detail with reference to the drawings hereinafter.

Figure 1:
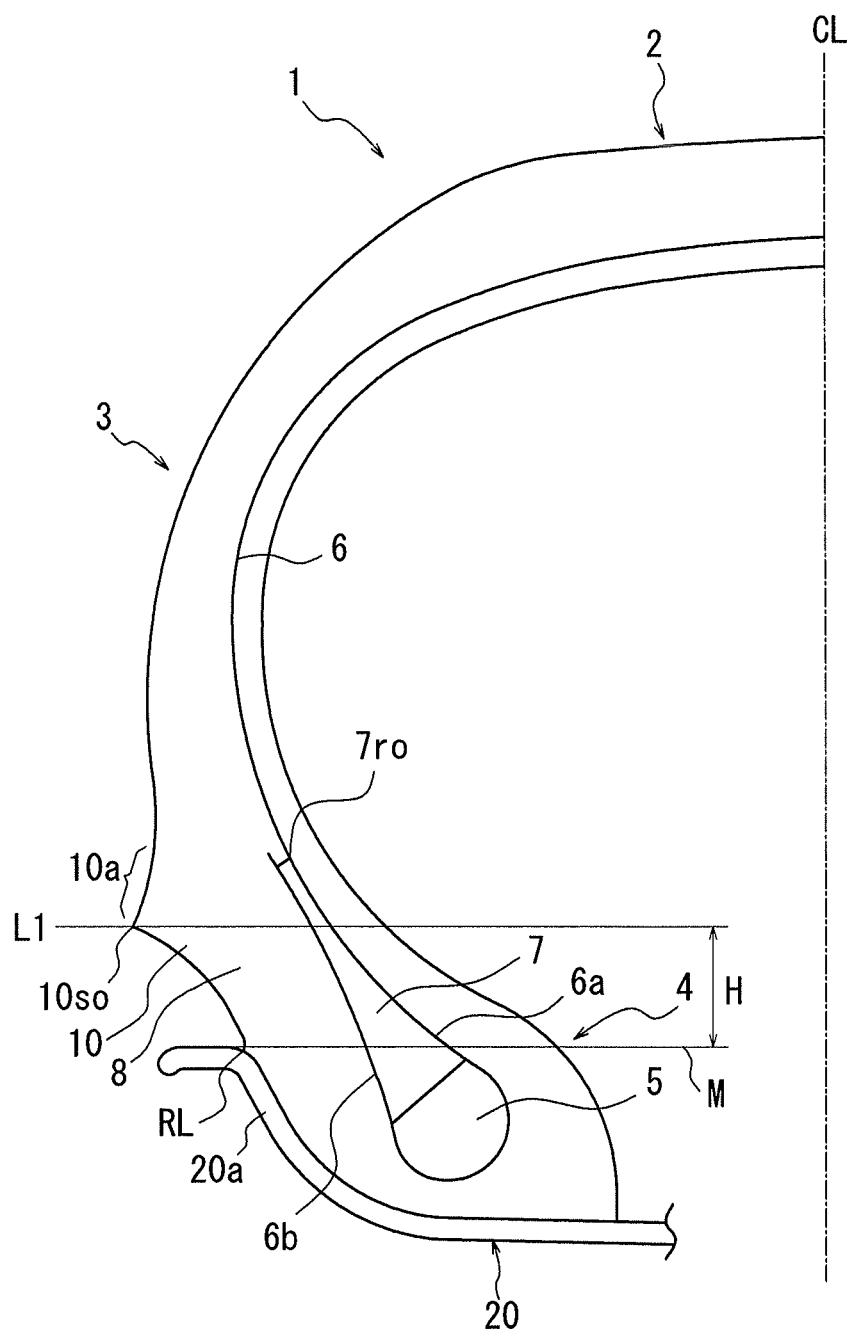
FIG. 1 is a cross sectional view in the tire width direction of a half portion of a pneumatic tire according to one example of the present invention in a state where the tire has been assembled with a prescribed rim.

FIG. 1 is a cross sectional view in the tire width direction of a half portion, demarcated by the tire equatorial plane CL as a border line, of a pneumatic tire 1 according to one example of the present invention. The other half portion in the width direction of the tire is not shown because it has the same structure as the half portion in the tire width direction illustrated in FIG. 1.

FIG. 1 shows a cross sectional view in the width direction of the tire in a state where the tire has been assembled with a prescribed rim and inflated at the prescribed internal pressure with no load exerted thereon.

The tire 1 has a tread portion 2, a pair of sidewall portions 3 extending from respective side portions of the tread portion 2 toward the inner side in the tire radial direction, and a pair of bead portions 4 extending from the respective sidewall portions 3 toward the inner side in the tire radial direction, as shown in FIG. 1.

Further, the tire 1 has a pair of bead cores 5 embedded in the respective bead portions 4 (only the bead core on one side is shown in FIG. 1) and a radial carcass 6 constituted of at least one carcass ply (a single ply in FIG. 1) and provided in a toroidal shape across the pair of bead cores 5 such that the carcass 6 is engaged with and held by the bead cores 5.

The radial carcass 6 of the tire 1 shown in FIG. 1 includes: a carcass main body 6a folded up around the respective bead cores 5 from the inner side toward the outer side in the tire width direction to be engaged with and held by the bead cores 5; and carcass folded-up portions 6b each extending from the carcass main body 6a and folded up around the corresponding bead core 5 from the inner side toward the outer side in the tire width direction. The pneumatic tire of the present invention, however, is not restricted to the structure of the pneumatic tire 1 described above and, for example, the radial carcass 6 may be wound up around the bead cores 5 or folded up around the bead cores 5 from the outer side toward the inner side in the tire width direction. Further, the radial carcass of the pneumatic tire of the present invention may be constituted of a plurality of plies, according to necessity, although FIG. 1 shows a case where the radial carcass is constituted of a single ply. Yet further, the carcass of the pneumatic tire of the present invention may be a bias carcass, although FIG. 1 shows a case where the carcass is a radial carcass.

The tire 1 has a bead filler 7 on the outer side in the tire radial direction of each bead core 5 embedded in the corresponding bead portion 4 in a region between the carcass main body 6a and the carcass folded-up portion 6b so that the bead filler 7 gradually decreases thickness thereof toward the outer side in the tire radial direction along the radial carcass 6. The bead filler 7 has a substantially triangular shape in FIG. 1.

The tire 1 further has: a rubber chafer 8 on the outer side in the tire width direction of the carcass folded-up portion 6b; and an annular rim guard 10 provided on the outer side in the tire radial direction than a rim line position RL set on a surface of the rubber chafer 8 such that the rim guard 10 protrudes on the outer side in the tire width direction and extends continuously in the tire circumferential direction.

The rim guard 10 has a substantially triangular cross section with a single peak 10so in FIG. 1. Although the cross section of the rim guard 10 is substantially triangular in the example shown in FIG. 1, the cross sectional shape of the rim guard 10 is not limited thereto and may take on various configurations. For example, the cross sectional shape of the rim guard 10, which has a single peak on the outermost side in the tire width direction in the example shown in FIG. 1, may instead be a configuration having two peaks in the tire width direction (e.g. a substantially trapezoidal shape) or other configurations. In this connection, a "rim line position RL" represents a rim-tire separation point at which the tire separates from a prescribed rim in a state where the tire has been assembled with the prescribed rim and inflated at prescribed internal pressure with no load thereon.

Figure 2:
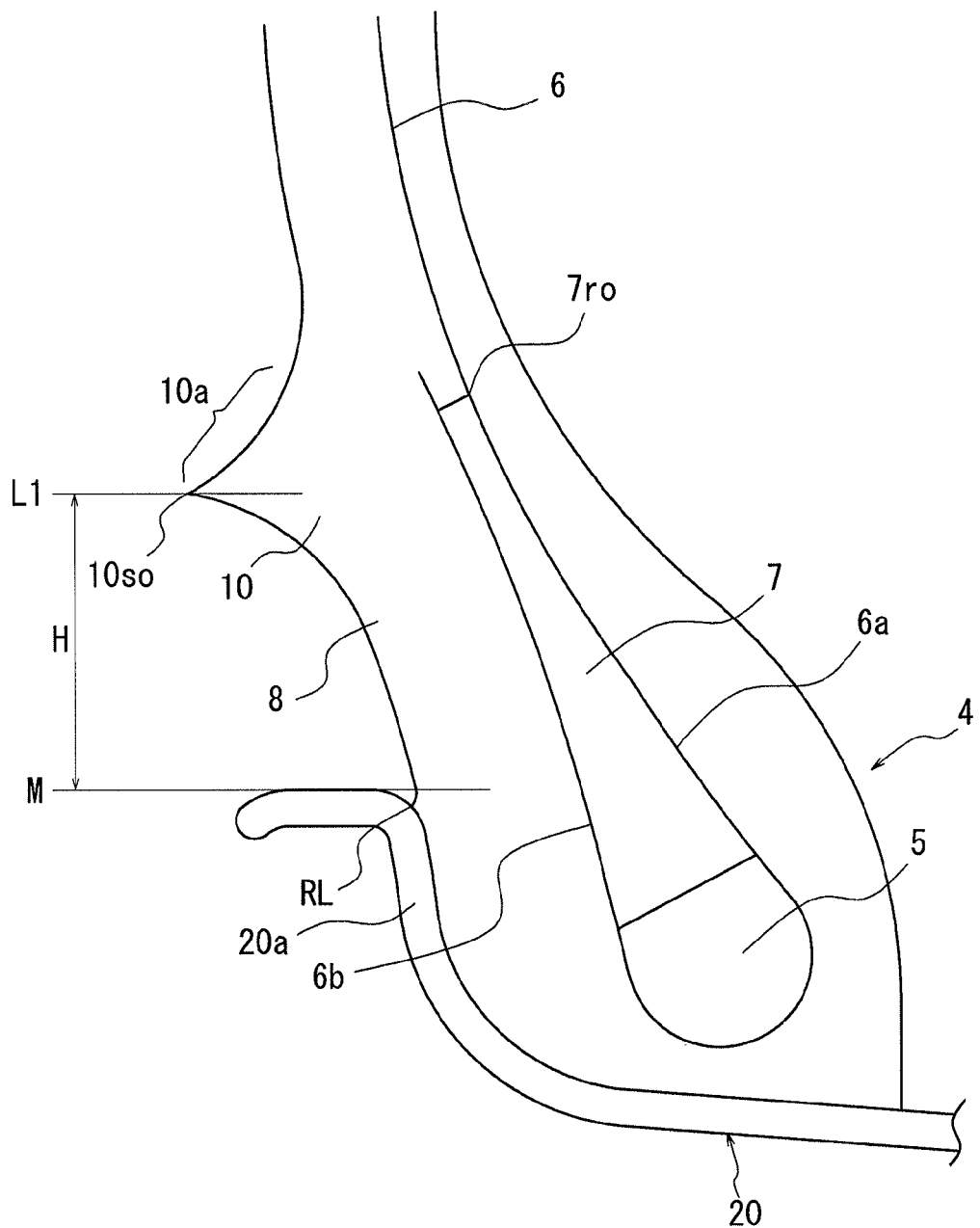
FIG. 2 is a partial cross sectional view in the width direction of the tire shown in FIG. 1, showing the vicinity of a bead portion of the tire in an enlarged manner.

FIG. 2 is a partial cross sectional view in the width direction of the tire shown in FIG. 1, showing the vicinity of the bead portion 4 of a half portion in the width direction of the tire in an enlarged manner.

In the tire 1 shown in FIG. 1 and FIG. 2, an outer contour line of a portion 10a on the outer side in the tire radial direction (than the peak 10so), of the rim guard 10, (which portion 10a may occasionally be referred to as a "rim guard radially outer side portion" hereinafter) has a curved configuration protruding on the outer side in the tire width direction toward the inner side in the tire radial direction and a radius of curvature R of the outer contour line is 5 mm≤R≤40 mm.

An imaginary line L1 is set to pass through the peak 10so of the rim guard 10 and be in parallel with the rotation axis of the tire and an imaginary line M is set to pass through the outermost position in the tire radial direction of a rim flange 20a of a rim 20 and be in parallel with the rotation axis of the tire, as shown in FIG. 2. Further, a distance in the tire radial direction measured from the peak 10so of the rim guard 10 to the outermost position in the tire radial direction of the rim flange, i.e. a distance between the imaginary line L1 and the imaginary line M, is regarded as H. The distance H is 2 mm≤H≤40 mm in the tire 1 shown in FIG. 2.

As described above, in the tire of the present embodiment, the outer contour line of the rim guard radially outer side portion 10a situated on the outer side in the tire radial direction than the outermost peak in the tire radial direction of the at least one peak of the rim guard 10 (the rim guard 10 has only one peak 10so in the example shown in the drawings) has an arcuate configuration of which the center of curvature is located on the external side of the tire; radius of curvature R of the outer contour line is 5 mm≤R≤40 mm; and provided that H represents a distance in the tire radial direction measured from the innermost peak in the tire radial direction of the at least one peak of the rim guard 10 (the rim guard 10 has only one peak 10so in the example shown in the drawings) to the outermost position in the tire radial direction of the rim flange, 2 mm≤H≤40 mm.

An effect of the tire of the present embodiment will be described hereinafter.

In the pneumatic tire 1, the larger radius of curvature R of the contour of the rim guard radially outer side portion 10a results in the larger volume of the rim guard portion. The larger volume of the rim guard portion results in the larger hysteresis loss in the rim guard caused by deformation force applied in the tire width direction. Accordingly, the larger radius of curvature R results in the larger hysteresis loss in the rim guard.

On this basis, setting the radius of curvature R to be 40 mm or less can suppress an increase in volume of the rim guard radially outer side portion 10a and thus an increase in hysteresis loss in this rim guard portion, although the rim guard radially outer side portion 10a is then made somewhat susceptible to deformation.

Further, rigidities of the sidewall portions adequately decrease in this case, whereby a magnitude of deformation borne by the sidewall portions increases and a magnitude of deformation borne by the tread portion decreases in the tire as a whole accordingly, to successfully reduce hysteresis loss in the tread portion.

The aforementioned two hysteresis loss-reducing effects synergistically reduce rolling resistance of the tire.

Yet further, a decrease in weight of the rim guard contributes to reduction of rolling resistance, as well as reduction of production cost, of the tire. In this connection, setting the radius of curvature R to be at least 5 mm ensures a good rim-protecting effect by the rim guard.

Accordingly, it is possible to reduce rolling resistance of the tire as a whole without adversely affecting the rim-protecting effect by the rim guard by setting the radius of curvature R to be within the aforementioned range.

Yet further, it is possible to reduce rolling resistance of the tire as a whole without adversely affecting the rim-protecting effect by the rim guard by setting the distance H in the tire radial direction to be 2 mm≤H≤40 mm in the pneumatic tire 1. Specifically, it is possible to avoid an excessive increase in volume of the rim guard, i.e. decrease mass of the rim guard portion, and adequately decrease rigidities of the sidewall portions to increase deformation thereof and thus reduce deformation of the tread portion having a large volume accordingly by setting the distance H in the tire radial direction to be H≤40 mm. Tire weight can be also reduced in this case. These effects synergistically contribute to further reduction of rolling resistance of the tire.

In this connection, it is possible to prevent a trouble in assembling the tire with a rim from occurring, with ensuring a good rim-protecting effect by the rim guard, by setting the distance H in the tire radial direction to be H≥2 mm.

It is also possible to suppress falling deformation of the bead portions to reduce rolling resistance of the tire by setting the distance H in the tire radial direction to be H≥2 mm. Setting the radius of curvature R of the outer contour line of the rim guard to be 5 mm≤R≤40 mm, in particular, facilitates deformation in the tire side portions on the outer side in the tire radial direction of the rim guard and thus suppresses deformation of the tread portion and the bead portions. In this connection, also setting the distance H in the tire radial direction to be 2 mm≤H≤40 mm in the tire is further advantageous because then falling deformation of the bead portions can be even better suppressed.

The radius of curvature R is preferably 15 mm or less (5 mm to 15 mm) and more preferably 10 mm or less (5 mm to 10 mm) in the pneumatic tire of the present invention because then rolling resistance of the tire as a whole can be further reduced.

The distance H in the tire radial direction is preferably 20 mm or less (2 mm to 20 mm) and more preferably 10 mm or less (2 mm to 10 mm) in the pneumatic tire of the present invention.

Setting the distance H in the tire radial direction to be in the aforementioned range prevents the volume of the rim guard from increasing excessively and thus successfully reduces rolling resistance of the tire as a whole. In this connection, the distance H in the tire radial direction is preferably 5 mm or more (5 mm to 40 mm) because then the rim guard firmly supports the bead portions to suppress falling deformation of the bead portions, which can further reduce rolling resistance of the tire as a whole.

The outermost end 7ro in the tire radial direction of each bead filler 7 is preferably situated within a range in the tire radial direction defined, when the outermost position in the tire radial direction of the rim flange is regarded as a reference point, from a position 5 mm on the inner side in the tire radial direction of the reference point to a position 40 mm on the outer side in the tire radial direction of the reference point.

In the case of the conventional tire in which a radius of curvature R of the outer contour line of a rim guard exceeds 40 mm, positioning the outermost end 7ro in the tire radial direction of each bead filler 7 within a range in the tire radial direction defined, when the outermost position in the tire radial direction of the rim flange is regarded as a reference point, between the reference position and a position 40 mm on the outer side in the tire radial direction of the reference point will result in too much deformation, i.e. too much hysteresis loss, at the rim guard portion, thereby increasing rolling resistance of the tire. In contrast, in the present invention in which the radius of curvature R of the outer contour line of the rim guard is equal to or smaller than 40 mm, positioning the outermost end 7ro in the tire radial direction of each bead filler 7, when the outermost position in the tire radial direction of the rim flange is regarded as a reference point, on or below the position 40 mm on the outer side in the tire radial direction of the reference point i) well decreases the weight of each bead filler which is generally a high rigidity, high hysteresis member and thus reduces hysteresis loss in the bead filler and ii) facilitates eccentric deformation and thus reduces hysteresis loss of the tread portion, with suppressing an increase in hysteresis loss in the rim guard portion, thereby successfully reducing rolling resistance of the tire as a whole.

Further, in the present invention, positioning the outermost end 7ro in the tire radial direction of each bead filler 7 on or above the position 5 mm on the inner side in the tire radial direction of the reference point ensures satisfactorily high rigidity of the bead portion on the inner side in the tire radial direction of the reference point, as compared with the rigidity of the bead portion at the outermost position in the tire radial direction of the rim flange, thereby well suppressing deformation, i.e. hysteresis loss, of the bead portion.

Elastic modulus of the bead filler ($E_B$) applicable to the pneumatic tire of the present invention is preferably in the range of 200% to 3000% of elastic modulus of the rim guard ($E_R$).

Elastic modulus ($E_B$) of the bead filler ≥200% of elastic modulus ($E_R$) of the rim guard ensures satisfactory high rigidity of the bead portion, suppresses deformation of the bead portion, and thus reduces hysteresis loss in the bead portion. Elastic modulus ($E_B$) of the bead filler >3000% of elastic modulus ($E_R$) of the rim guard, however, increases rigidity of the sidewall portion too much, thereby possibly increasing hysteresis loss in the tread portion. It is therefore possible to further reduce rolling resistance of the tire as a whole by setting a ratio of $E_B$ with respect to $E_R$ to be in the aforementioned range. In this connection, a higher ratio of $E_B$ with respect to $E_R$ within the aforementioned range is more preferable in terms of ensuring satisfactory high rigidity. Accordingly, setting the ratio of $E_B$ with respect to $E_R$ to be in the range of 1000% to 2000% is particularly preferable for the same reasons as described above.

Loss tangent of the bead filler (tan $\delta_B$) applicable to the pneumatic tire of the present invention is preferably in the range of 0% to 600% (exclusive of 0% and inclusive 600%) of loss tangent of the rim guard (tan $\delta_R$). Loss tangent (tan $\delta_B$) of the bead filler ≤600% of loss tangent (tan $\delta_R$) of the rim guard suppresses an excessive increase in hysteresis loss in the bead filler, thereby successfully further reducing rolling resistance of the tire as a whole.

In this connection, a smaller ratio of tan $\delta_B$ with respect to tan $\delta_R$ within the aforementioned range is more preferable in terms of rolling resistance (the smaller tan $\delta_B$ results in the less hysteresis loss). Accordingly, setting the ratio of tan $\delta_B$ with respect to tan $\delta_R$ to be in the range of 20% to 300% is particularly preferable for the same reasons as described above.

The rim guard may be provided in only one of the bead portions in the pneumatic tire of the present invention, although a pair of the rim guards 10 are provided in a pair of the bead portions 4, respectively, in the pneumatic tire 1 according to the one example of the present invention shown in FIG. 1. In this case, an effect equivalent to that of the foregoing embodiment can be obtained by mounting the tire on a vehicle such that the side provided with the rim guard, of the tire, is oriented on the vehicle outer side.

EXAMPLES

The present invention will be described further in detail by Examples hereinafter without being restricted thereto by any means.

Test tires of Examples 1 to 20 and Comparative Examples 1 to 4 were prepared and each subjected to the following evaluations in order to confirm the effect of the present invention.

The relevant characteristics of each test tire, together with the evaluation results thereof, are shown in Table 1 below. "Radial position of the outermost end in tire radial direction of bead filler" of item D in Table 1 represents a radial distance between the radially outermost end of the bead filler and the radially outermost position of a rim flange as a reference point and is expressed by a positive/negative number when the radially outermost end of the bead filler is on the outer/inner side in the tire radial direction of the reference point.

(1) Rolling Resistance Test

Each of the pneumatic test tires (225/45R17) was assembled with a prescribed rim (7.5 J) prescribed by JATMA's tire standards, whereby a pneumatic tire-rim assembly was prepared. The pneumatic test tire thus assembled with the rim was mounted on a vehicle under the conditions of internal pressure: 230 kPa and load: 4.41 kN and subjected to a rolling resistance test described below.

Rolling resistance was determined for evaluation, by running the aforementioned pneumatic test tire on an iron drum surface (diameter: 1.7 m) of a drum tester at 80 km/hour, then allowing the tire to travel by inertial force and measuring rolling resistance from deceleration of the tire. More specifically, each rolling resistance value was calculated as an index value relative to the corresponding evaluation result "100" of Comparative Example 1, for evaluation. The evaluation results thus calculated are shown in Table 1. The smaller index value represents the smaller rolling resistance, i.e. the better fuel efficiency.

(2) Measurement of Mass of Tire

The mass of each pneumatic test tire prior to being assembled with a rim was measured. Specifically, the mass value of the tire was calculated as an index value relative to the corresponding evaluation result "100" of Comparative Example 1, for evaluation. The evaluation results thus calculated are shown in Table 1. The smaller index value represents the better effect of reducing tire weight.

(3) Rim Protection Performance Test

Figure 3:
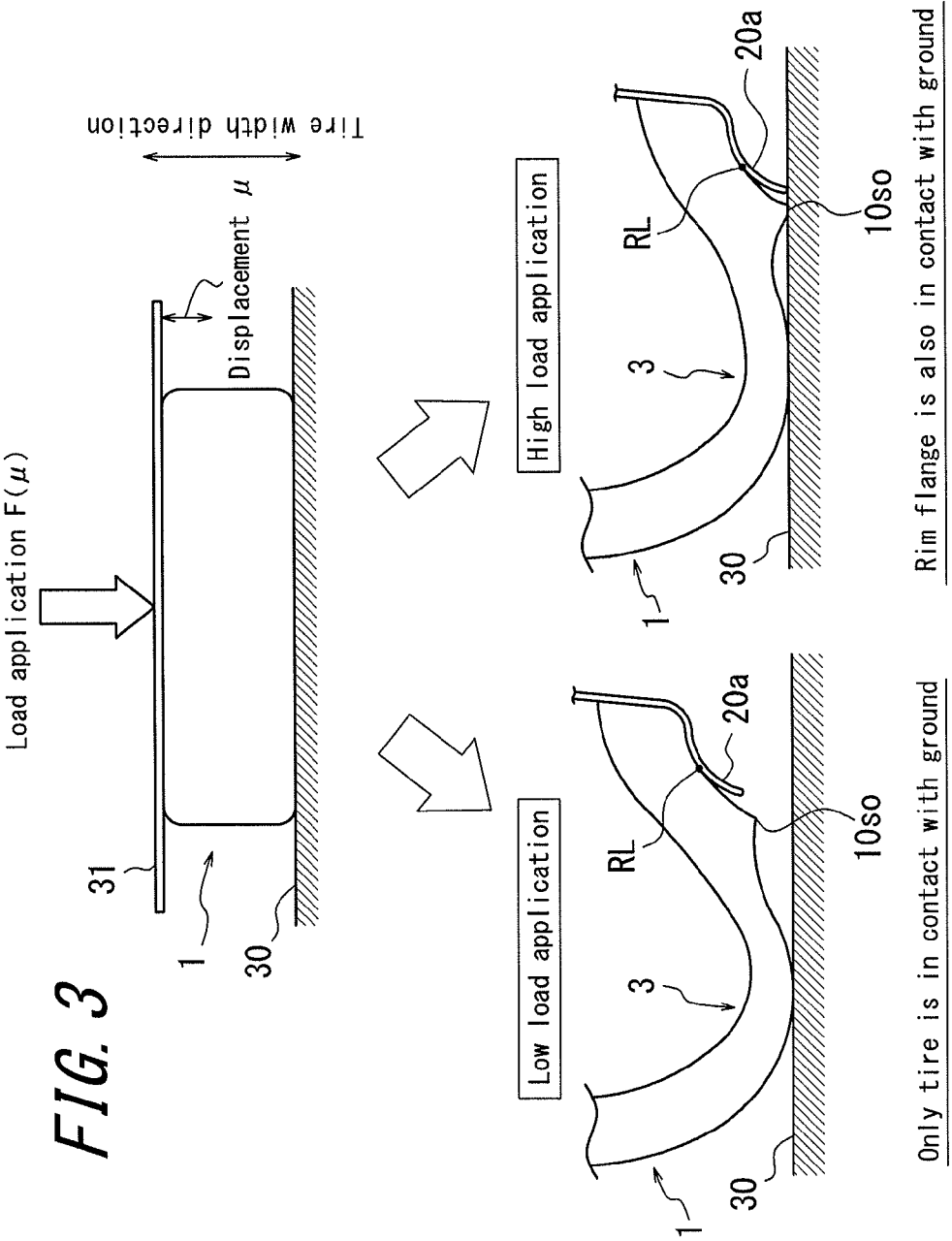
FIG. 3 is a diagram showing a scheme of a testing method of a rim protection performance test.

Each of the pneumatic test tires was assembled with a prescribed rim (7.5 J) prescribed by JATMA's tire standards, whereby a pneumatic tire-rim assembly was prepared. The pneumatic test tire thus assembled with the rim was then subjected to a rim protection performance test described below in a state where the tire was not inflated (i.e. at internal pressure: 0 kPa) to simulate a situation in which the tire-rim assembly is in storage. FIG. 3 shows a scheme of a testing method of a rim protection performance test. Rim protection performance was determined by: putting each pneumatic test tire (e.g. the pneumatic tire 1 according to the one example of the present invention) down sideways in an Amsler testing machine such that one side surface of the tire faced a flat plate 30; putting an iron plate 31 on the other side surface of the tire; applying load on the tire from the iron plate 31 side toward the flat plate 30 side; and calculating energy required for a rim flange 20a of a rim 20 assembled with the tire on the flat plate 30 side to be brought into contact with the flat plate 30. Specifically, the rim protection performance value of the tire was calculated as an index value relative to the corresponding evaluation result "100" of Comparative Example 1, for evaluation. The evaluation results thus obtained are shown in Table 1. The larger index value represents the better effect of rim protection.

TABLE 1

| | Items | Comp. Ex. 1 | Ex. 1 | Ex. 2 | Ex. 3 | Ex. 4 | Ex. 5 | Ex. 6 | Comp. Ex. 2 | Comp. Ex. 3 | Ex. 7 | Ex. 8 | Ex. 9 |
|---|---|---|---|---|---|---|---|---|---|---|---|---|---|
| A | Cross sectional shape of rim guard | *Tri | Tri | Tri | Tri | Tri | Tri | Tri | Tri | Tri | Tri | Tri | Tri |
| B | Radius of curvature (R mm) of outer contour line of rim guard | 50 | 40 | 15 | 10 | 20 | 8 | 5 | 3 | 8 | 8 | 8 | 8 |
| C | Distance H (mm) | 18 | 18 | 18 | 18 | 18 | 18 | 18 | 18 | 50 | 40 | 20 | 10 |
| D | Radial position (mm) of the outermost end in tire radial direction of bead filler | 30 | 30 | 30 | 30 | 30 | 30 | 30 | 30 | 30 | 30 | 30 | 30 |
| Performances | Rolling resistance index | 100 | 98 | 96 | 95 | 97 | 95 | 96 | 99 | 100 | 98 | 97 | 95 |
| | Mass index | 100 | 99 | 98 | 98 | 99 | 97 | 95 | 94 | 101 | 99 | 98 | 97 |
| | Rim protection performance index | 100 | 100 | 100 | 100 | 100 | 100 | 100 | 97 | 103 | 102 | 101 | 100 |

| | Items | Ex. 10 | Comp. Ex. 4 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|
| A | Cross sectional shape of rim | Tri | Tri | Tri | Tri | Tri | Tri | Tri | *Trape | Tri | Tri | Tri | Tri |

TABLE 1-continued

| | | | | | | | | | | | | | |
|---|---|---|---|---|---|---|---|---|---|---|---|---|---|
| | guard | | | | | | | | | | | | |
| B | Radius of curvature (R mm) of outer contour line of rim guard | 8 | 8 | 8 | 8 | 8 | 8 | 8 | 8 | 8 | 8 | 8 | 8 |
| C | Distance H (mm) | 2 | 1 | 10 | 10 | 10 | 10 | 10 | 10 | 5 | 8 | 12 | 15 |
| D | Radial position (mm) of the outermost end in tire radial direction of bead filler | 30 | 30 | 50 | 40 | 10 | −5 | −7 | 10 | 30 | 30 | 30 | 30 |
| Περfoρμ ανχεσ | Rolling resistance index | 96 | 99 | 99 | 97 | 93 | 94 | 99 | 94 | 94 | 94 | 95 | 95 |
| | Mass index | 95 | 94 | 100 | 98 | 95 | 92 | 93 | 96 | 96 | 97 | 97 | 97 |
| | Rim protection performance index | 100 | 98 | 102 | 100 | 100 | 100 | 100 | 101 | 100 | 100 | 100 | 100 |

*Tri = substantially triangular
*Trape = substantially trapezoidal

It is understood from the results shown in Table 1 that the Example test tires each having the radius of curvature R of the outer contour line and the distance H set in the appropriate ranges, respectively, can reduce weight and rolling resistance thereof with maintaining a good rim-protecting effect by a rim guard.

Further, it is understood that the Examples test tires each having the radius of curvature R of the outer contour line set in the further appropriate or a preferable range can further reduce rolling resistance thereof.

Yet further, it is understood that the Examples test tires each having the distance H set in the further appropriate or a preferable range can further reduce rolling resistance thereof.

Yet further, it is understood from the results shown in Table 1 that the Examples test tires in each of which the outermost end in the tire radial direction of a bead filler was situated at a preferable position in the tire radial direction can further reduce rolling resistance thereof.

INDUSTRIAL APPLICABILITY

The pneumatic tire according to the present invention can reduce rolling resistance thereof with ensuring a good effect of protecting a rim by a rim guard.

REFERENCE SIGNS LIST

1 Pneumatic tire
2 Tread portion
3 Sidewall portion
4 Bead portion
5 Bead core
6 Carcass
6a Carcass main body
6b Carcass folded-up portion
7 Bead filler
7ro Outermost end in tire radial direction of bead filler
8 Rubber chafer
10 Rim guard
10a Rim guard radially outer side portion
10so Peak of rim guard
20 Rim
20a Rim flange
30 Flat plate
31 Iron plate
CL Tire equatorial plane

The invention claimed is:

1. A tire-rim assembly of a pneumatic tire and a prescribed rim, the tire comprising at least sidewall portions and rim guards, the rim guards each being provided at the corresponding sidewall portion to protrude on the outer side in the tire width direction, wherein:

in a cross section of the tire in the width direction thereof in a state where the tire has been assembled with the prescribed rim and inflated at prescribed internal pressure with no load thereon, each rim guard has at least one peak;

an outer contour line, of the rim guard, situated on the outer side in the tire radial direction than the outermost peak in the tire radial direction of the at least one peak, has an arcuate configuration of which the center of curvature is located on the external side of the tire;

radius of curvature R of the outer contour line is in the range of 5 mm≤R<8 mm;

provided that H represents a distance in the tire radial direction measured from the innermost peak in the tire radial direction of the at least one peak of the rim guard to the outermost position in the tire radial direction of a rim flange, 10 mm<H≤40 mm; and in the cross section of the tire in the width direction thereof, an outer contour line of a portion, on the inner side in the tire radial direction than the innermost peak to the outermost position in the tire radial direction of the rim flange, of the rim guard is constituted exclusively of a curved configuration concaved from the outer side toward the inner side in the tire width direction.

2. The tire-rim assembly of claim 1, wherein the distance H in the tire radial direction is in the range of 10 mm<H≤20 mm.

3. The tire-rim assembly of claim 1, further comprising a pair of bead cores and a pair of bead fillers respectively provided on the outer side in the tire radial direction of the bead cores, wherein elastic modulus of the bead filler is in the range of 200% to 3000% of elastic modulus of the rim guard, and loss tangent of the bead filler is in the range of substantially 0% to 600% of loss tangent of the rim guard.

4. A tire-rim assembly of a pneumatic tire and a prescribed rim, the tire comprising at least sidewall portions, a pair of bead cores, a pair of bead fillers respectively provided on the outer side in the tire radial direction of the bead cores, and rim guards, the rim guards each being provided at the corresponding sidewall portion to protrude on the outer side in the tire width direction, wherein:

in a cross section of the tire in the width direction thereof in a state where the tire has been assembled with the prescribed rim and inflated at prescribed internal pressure with no load thereon, each rim guard has at least one peak;

an outer contour line, of the rim guard, situated on the outer side in the tire radial direction than the outermost peak in the tire radial direction of the at least one peak, has an arcuate configuration of which the center of curvature is located on the external side of the tire;

radius of curvature R of the outer contour line is in the range of $5 \text{ mm} \leq R < 10 \text{ mm}$;

provided that H represents a distance in the tire radial direction measured from the innermost peak in the tire radial direction of the at least one peak of the rim guard to the outermost position in the tire radial direction of a rim flange, $10 \text{ mm} < H \leq 40 \text{ mm}$;

in the cross section of the tire in the width direction thereof, an outer contour line of a portion, on the inner side in the tire radial direction than the innermost peak to the outermost position in the tire radial direction of the rim flange, of the rim guard is constituted exclusively of a curved configuration concaved from the outer side toward the inner side in the tire width direction; and wherein, in the cross section of the tire in the width direction thereof in a state where the tire has been assembled with the prescribed rim and inflated at prescribed internal pressure with no load thereon, the outermost end in the tire radial direction of each bead filler is situated within a range in the tire radial direction defined, when the outermost position in the tire radial direction of the rim flange is regarded as a reference point, from a position 5 mm on the inner side in the tire radial direction of the reference point to a position 40 mm on the outer side in the tire radial direction of the reference point.

5. The tire-rim assembly of claim 4, wherein the distance H in the tire radial direction is in the range of $10 \text{ mm} < H \leq 20 \text{ mm}$.

6. The tire-rim assembly of claim 4, wherein the radius of curvature R is in the range of $5 \text{ mm} \leq R \leq 8 \text{ mm}$.

7. The tire-rim assembly of claim 4, further comprising a pair of bead cores and a pair of bead fillers respectively provided on the outer side in the tire radial direction of the bead cores, wherein elastic modulus of the bead filler is in the range of 200% to 3000% of elastic modulus of the rim guard, and loss tangent of the bead filler is in the range of substantially 0% to 600% of loss tangent of the rim guard.

8. The tire-rim assembly of claim 1, wherein the at least one peak of each rim guard protrudes on the outer side in the tire width direction than the rim flange.

* * * * *